United States Patent [19]

Sato et al.

[11] 4,230,927
[45] Oct. 28, 1980

[54] APPARATUS FOR ELECTRICAL DISCHARGE MACHINING OF CYLINDRICAL WORK

[75] Inventors: Kunihiko Sato, Owari-Asahi; Tetsuro Urata; Tetsuhiro Asamoto, both of Nagoya; Kobun Asakawa, Fukuyama; Takeo Uebayashi, Fukuyama; Haruo Taguchi, Fukuyama, all of Japan

[73] Assignees: Mitsubishi Denki Kabushiki Kaisha; Nippon Kokan Kabushiki Kaisha, both of Tokyo, Japan

[21] Appl. No.: 920,984

[22] Filed: Jun. 30, 1978

[51] Int. Cl.³ .................................................. B23P 1/02
[52] U.S. Cl. .................................. 219/69 C; 219/69 P
[58] Field of Search ................ 219/69 M, 69 R, 69 G, 219/69 P, 69 C

[56] References Cited

U.S. PATENT DOCUMENTS

| | | | |
|---|---|---|---|
| 3,600,546 | 8/1971 | Osaka et al. | 219/69 M |
| 3,878,353 | 4/1975 | Anderson | 219/69 M |
| 3,941,970 | 3/1976 | Grow | 219/69 M |
| 4,004,123 | 1/1977 | Inoue | 219/69 M |

FOREIGN PATENT DOCUMENTS 1322711 2/1963 France .................................. 219/69 M Primary Examiner—Thomas J. Kozma
Assistant Examiner—Clifford C. Shaw
Attorney, Agent, or Firm—Fleit & Jacobson

[57] ABSTRACT

Disclosed are a process and apparatus for electrical discharge machining of the outer surface of a satinizing roll to produce a satin-like roughened surface of a uniform roughness. This electrical discharge machining process produces a uniform satin-like roughened surface on the outer surface at each end of the roll, and for this purpose the process involves a step of decreasing the discharge current in proportion to decrease in the area which is to be worked by an electrode located at the roll end and thereby maintaining the flow of current per unit area at a constant value. The apparatus for performing the process comprises position detecting-means for detecting that the electrode has been moved to the roll end, and means responsive to the output signal of the position detecting means to control the off-time of current pulse which causes a discharge between the electrode and the roll.

1 Claim, 3 Drawing Figures

APPARATUS FOR ELECTRICAL DISCHARGE MACHINING OF CYLINDRICAL WORK

BACKGROUND OF THE INVENTION

The present invention relates to electrical discharge machining processes and apparatus for cylindrical works which are designed to satinize by electrical discharge the outer surface of a cylindrical work to a desired surface roughness, and more particularly the invention relates to an electrical discharge machining process and apparatus capable of producing a satin-like roughened surface of a predetermined roughness on the outer surface at each end of a cylindrical work in the same manner as the remaining outer surface of the work.

In the past, the method of throwing hard metal particles, e.g., shot or grit, at the polished surface of strip rolling rolls, particularly cold rolling rolls, to produce impressions on the roll surface, has been used as a means of giving a satin-like finish to the surface of rolls, and recently attempts have been made to replace this type of process by electrical discharge machining. As is well known, electrical discharge machining is a process in which an insulating liquid such as kerosene is placed in a small discharge gap between an electrode and a work piece and a pulse voltage is periodically applied across the electrode and the workpiece to cause a discharge and thereby to work the surface of the workpiece. By repeatedly performing this electric discharge machining at the surface of a roll while rotating the roll in the circumferential direction and also gradually moving the electrode along the axis of rotation of the roll, it is possible to continuously give a spiral satin finish to the roll surface and thereby to produce spark eroded impressions all over the roll surface. This is the known method of giving a uniform satin finish to the surface of a roll by means of electrical discharge machining. The satinized surface produced in this way has many advantages, that is, not only the roughness is more marked and the shape is in excellent trim as compared with the mechanical impressions produced by the throwing of metal particles, but also the shape is not affected by the manufacturing method, hardness, etc., of the roll, and the metal structure in the roll surface is hardened by the electrical discharge thus making the roll optimum for rolling purpose and so on.

However, a disadvantage of this process relates to the working of the roll ends. More specifically, while the working of the roll surface by means of shot blasting or the like is capable of giving a uniform satiny finish all over the roll surface including the roll ends, the machining process by electric discharge is not capable of uniformly working the ends of the roll.

This deficiency will now be described in greater detail with reference to FIG. 1 of the accompanying drawings which shows a prior art electric discharge machine. In the figure, numeral 10 designates a working pulse source unit, 12 an electrode made for example of copper, 14 a roll to be subjected to satinization, 16 a holder of the electorde 12, 18 a head column for controlling the working gap between the electrode 12 and the roll 14, 20 a holder for the head column 18, 22 a sliding shaft for sliding the holder 20 in the direction of the arrow shown in the Figure. (in the lengthwise direction of the roll axis), and 24 a feed screw for the holder 20 which is adapted for computing the working area of the electrode 12. Numeral 28 designates a first reduction gear, 30 a feed screw rotating motor for sliding the electrode 12 along the sliding shaft 22, 32 roll supports for rotatably supporting the roll 14, 34 a second reduction gear, 36 a roll rotating motor, and 38 a feeding brush unit for feeding power to the roll 14.

With the machine described above, the electric discharge machining process will now be described. In the working of the roll 14, working conditions are first predetermined for the working pulse generating unit 10. The working conditions determine the surface roughness of a satin finish to be given to the surface of the roll 14. The working gap between the electrode 12 and the roll 14 is immersed in an insulating liquid such as kerosene and a pulse voltage is applied from the pulse source unit 10, thus causing a discharge and thereby performing electrical discharge machining. In this case, simultaneously the roll 14 is rotated and the electrode 12 is gradually moved along the axis of rotation of the roll 14, for example, from the left to the right in the Figure.

In other words, the electrode 12 works the surface of the roll 14 while spirally moving along the surface of the roll 14. The speed of feeding the electrode 12 along the roll axis is for example selected so that the desired satiny finish is given to the entire surface of the roll 14 for every movement of the electrode 12 past the roll 14. When the desired surface roughness for working is $18\mu$ Rmax and the roll diameter is on the order of $600\phi$, then the proper feed speed will be on the order of 2.5 mm/min. The rotational speed of the roll 14 should not be excessively low. Although the entire surface can still be machined by rotating the roll 14 so that the electrode 12 moves by an amount which is little less than the electrode width for every rotation of the roll, this tends to cause spiral scores on the surface of the roll 14 which are undesirable for rolling rolls, although practically no difference is perceivable by visual comparison. As a result, it is desirable that the rotational speed of the roll is as high as possible so long as the electrical discharge machining can be effected stably.

In other words, the working rate per roll rotation decreases with an increase in the rotational speed of the roll 14, thus eliminating the possibility of causing spiral scores on the surface of the roll 14. In this way, a uniform satin-finished surface is successively produced on the entire surface of the roll 14. However, this process cannot be successibly applied to the working of the ends of the roll 14. Namely, where the operation is terminated in response to the arrival of the electrode 12 at the end of the roll 14, if the working conditions have been preset to satisfy the minimum requirement of producing a satin-finished surface on the roll surface during the working of the central portion of the roll surface, this tends to leave at the end an unworked portion of a width corresponding to the width of the electrode 12. On the other hand, if the feed speed of the electrode 12 is decreased only during the periods of working the roll ends, the working rate at each end of the roll 14 will be increased thus failing to ensure uniform working of the entire surface. Still further, when the electrode 12 reaches the end of the roll 14, if the operation is not stopped and it is instead continued until the electrode 12 moves past the roll 14, the electrode 12 moves past the end of the roll 14 and the surface area worked is reduced with the resulting increase in the working rate per unit area, thus, as compared with the case where the entire face of the electrode 12 faces the roll 14, gradually increasing the depth of spark erosion and thereby forming a spiral stepped portion on the surface of the roll 14.

SUMMARY OF THE INVENTION

With a view to overcoming the foregoing deficiencies, the present invention has been made to ensure uniform machining of the ends of a roll.

Therefore, it is an object of the present invention to provide an electrical discharge machining process in which, when machining the roll end, the working current is decreased in proportion to decrease in the area subjected to electrical discharge machining due to the movement of an electrode past the roll end, thus maintaining the working rate per unit area constant.

It is another object of the invention to provide an electrical discharge machining process wherein the waveform of an applied voltage pulse is controlled to maintain the working current per unit area at a constant value.

It is still another object of the invention to provide an electrical discharge machining process wherein the waveform of the voltage pulse is controlled through the control of the off time of the pulse.

It is still another object of the invention to provide an electrical discharge machining apparatus wherein the working current per unit area is maintained constant when an electrode is moved past the end of a roll.

Other features and advantages of the invention will be apparent from the following description taken in connection with the accompanying drawings.

DETAILED DESCRIPTION OF THE PREFERRED EMBODIMENTS

Figure 1:
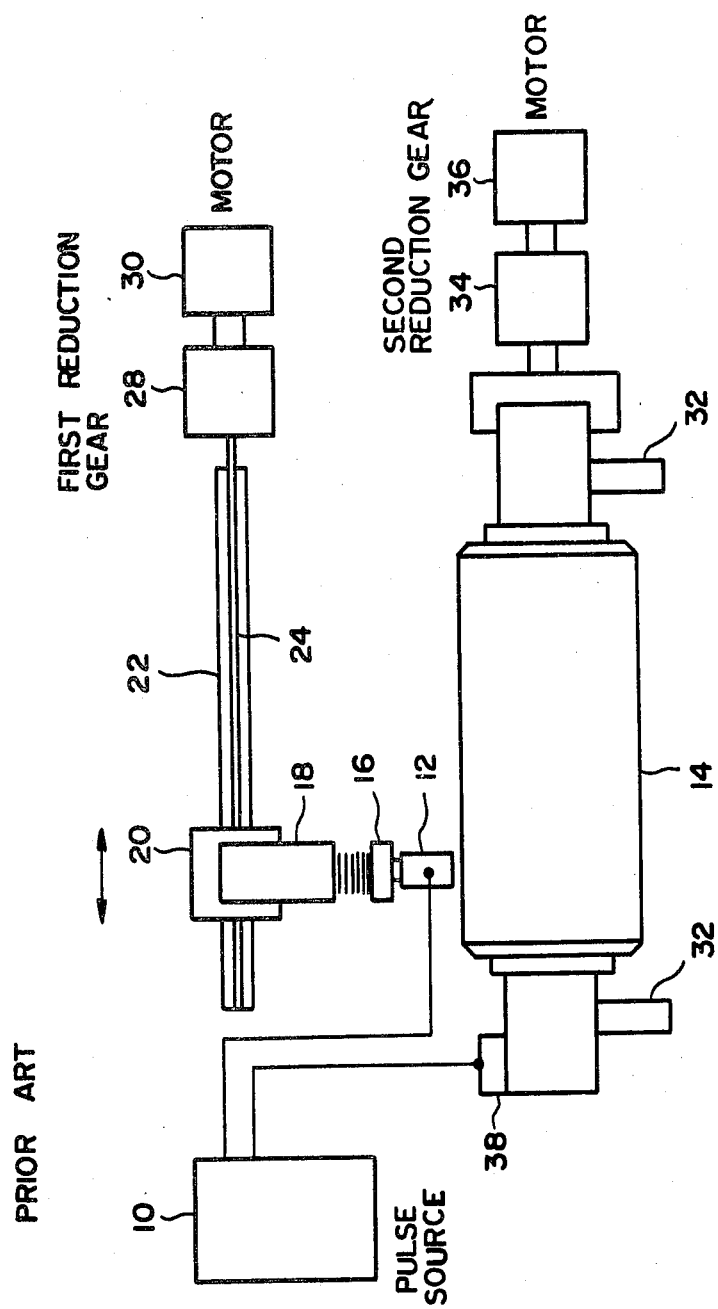
FIG. 1 is a schematic block diagram of a prior art electrical discharge machining apparatus for explaining a prior art electrical discharge machining process for cylindrical works.
Figure 2:
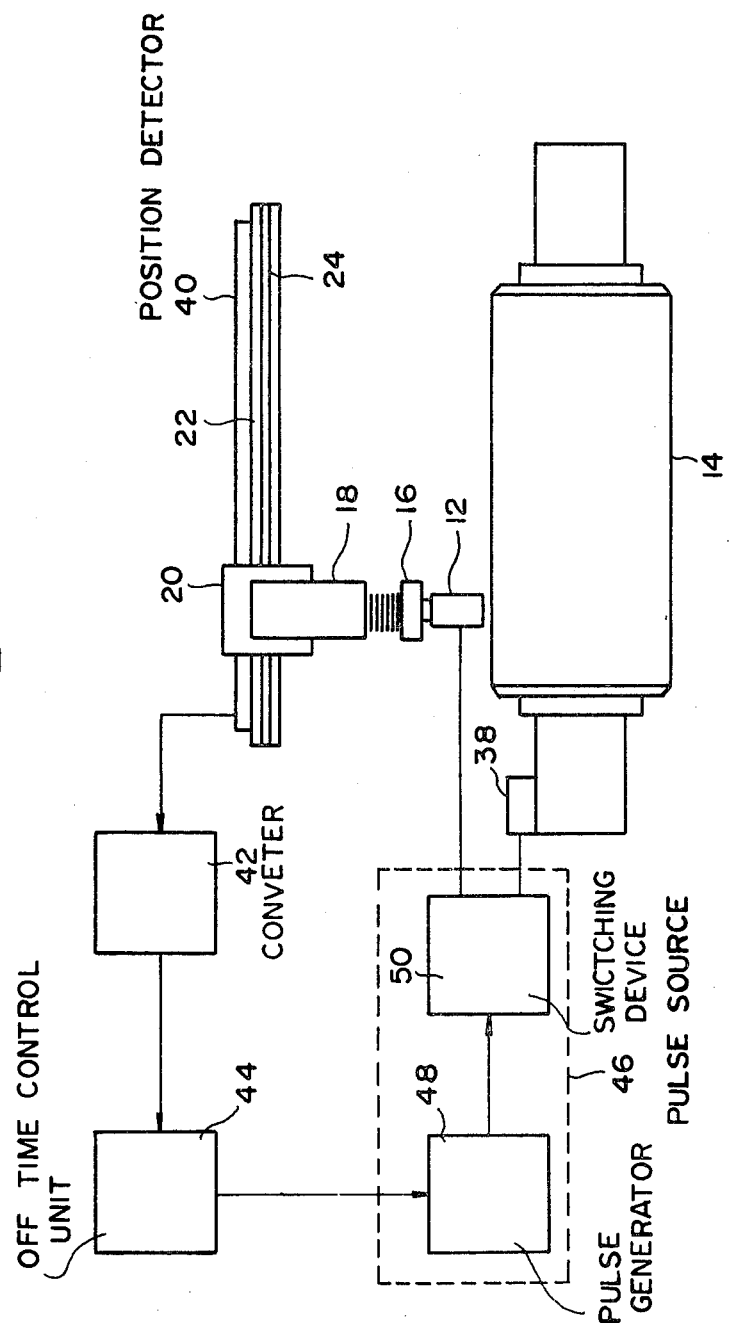
FIG. 2 is a schematic block diagram showing an embodiment of an electrical discharge machining apparatus according to the invention, which is used for performing a process according to the invention.

Referring to FIG. 2 showing an embodiment of the apparatus of this invention, the apparatus comprises, as in the case of the prior art apparatus of FIG. 1, an electrode 12, a roll 14, an electrode holder 16, a head column 18, a head column holder 20, a sliding shaft 22, a feed screw 24 and a feeding brush unit 38, and the apparatus further comprises a first reduction gear 28, a feed screw rotating motor 30, roll supports 32, a second reduction gear 34 and a roll rotating motor 36 which are identical with the counterparts of FIG. 1, although these parts are not shown in FIG. 2.

In addition to the above-described construction, the apparatus of this invention comprises a position detecting unit 40 disposed along the sliding shaft 22 for detecting the position of the electrode 12 in the lengthwise direction of the roll axis. The position detecting unit 40 may, for example, comprise a known means comprising a rack disposed along the sliding shaft 22, a pinion gear mounted on the holder 20 to mesh and rotate along with the rack and a pulse generator adapted to be rotated by the pinion gear to generate unit distance pulses indicative of the position of the electrode 12, or alternatively the detecting unit 40 may comprise any of other known means comprising, for example, a potentiometer disposed along the sliding shaft 22 and having its slide attached to the holder 20 so as to detect the position of the electrode 12 in accordance with a change in the resistance value. Numeral 42 designates a converter for converting the output signal of the position detecting unit 40 to an electric signal indicative of the position of the electrode 12, and a position at which the electrode 12 reaches the end of the roll 14 is preset into the converter 42 whereby, when the output signal of the position detecting unit 40 exceeds the preset value, namely, when a part of the electrode 12 moves past the end of the roll 14, a signal is generated which is proportional to the deviated dimension of the electrode 12 from the roll end. Numeral 44 designates an off time control unit which is responsive to the signal from the converter 42 to generate a signal for controlling the waveform of discharging voltage pulse applied across the electrode 12 and the roll 14 through the feeding brush unit 38. In other words, the off time control unit 44 increases the off time of voltage pulse in accordance with the magnitude of the signal from the converter 42, thus generating a control signal for decreasing the discharge working current. Numeral 46 designates a working pulse source unit comprising a pulse generator 48 and a switching device 50. The oscillation frequency of the pulse generator 48 is controlled by the signal from the off time control unit 44. The switching device 50 includes a current controller such as thyristor whereby, when the pulse signal from the pulse generator 48 is applied to the gate terminal of the thyristor, a voltage pulse is applied across the electrode 12 and the roll 14 to cause a discharge.

Next, the electrical discharge machining process according to the invention will be described with reference to FIG. 2. The process of machining the central portion of the roll 14 is the same with the previously mentioned process, and consequently only the machining of the roll 14 after the central portion of the roll 14 has been machined and the electrode 12 has reached the end of the roll 14 will be described. When the roll 14 is continuously machined at the same roll speed and the same feed speed of the electrode 12 in the lengthwise direction of the roll axis as in the case of the central portion of the roll 14, the electrode 12 eventually projects from the end of the roll 14, e.g., from the right end of the roll 14 in FIG. 2. In other words, the working area of the electrode 12 gradually decreases. If the operation is continued without any change, the working rate per unit area of the roll 14 will be increased thus causing a spiral score on the surface of the roll 14 as mentioned previously. In an attempt to overcome this deficiency, it is conceivable to maintain the working rate per unit area constant, and consequently it is only necessary to decrease the working current in proportion to a decrease in the working area. In other words, in FIG. 2, the position detecting unit 40 detects the position of the electrode 12 in the lengthwise direction of the roll axis to generate a detection signal and this detection signal is converted to an electric signal by the converter 42 whose output electric signal controls the off time control unit 44 so as to increase the off time of the pulse waveform generated from the pulse generator 48.

Since a change in the off time does not have any effect on the surface roughness, the consumption of the electrode, etc., only the working speed is changed in accordance with the working area to maintain the working rate per unit area constant. This permits uniform machining of the surface of the roll 14 from the central portion to the end.

In this way, the roll 14 can be uniformly machined all over the surface except the left end. As regards the left end of the roll 14, if the roll 14 is machined by moving the electrode 12 conversely toward the electrode position at which the operation was initially started, namely, from the right to the left in FIG. 2 at the same speed, the left end of the roll 14 can be similarly machined uniformly. In this case, the electrode 12 which was used for the machining of the right end of the roll 14 cannot be used for machining the left end of the roll 14. This is due to the fact that the working face of the electrode 12 no longer has a plane surface due to its being a consumable electrode, and consequently the used electrode 12 must be replaced by the new one for machining the left end of the roll 14.

Figure 3:
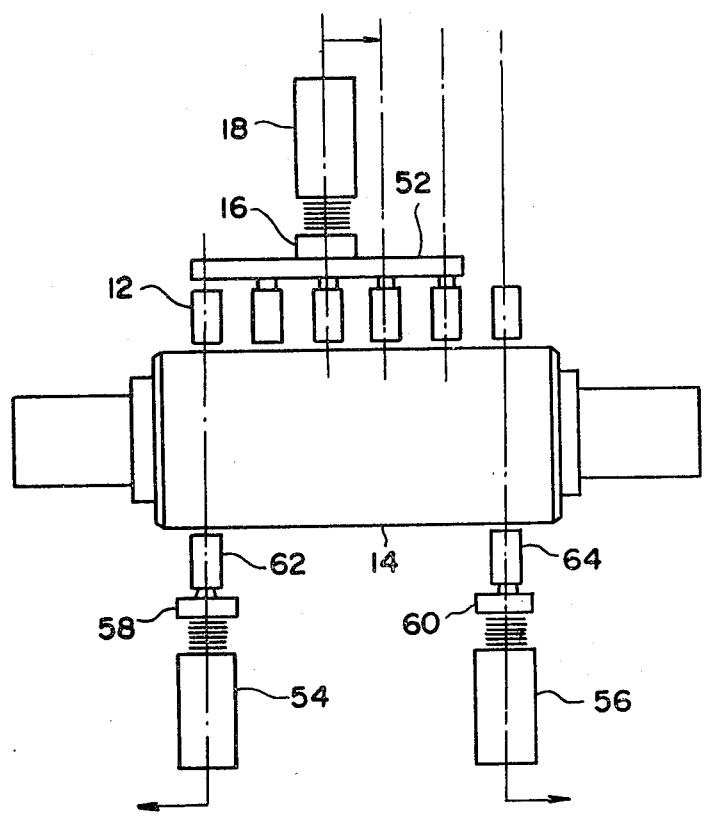
FIG. 3 is a schematic diagram showing principal parts of another embodiment of the electrical discharge machining apparatus according to the invention which is used for performing the process of the invention.

FIG. 3 is a schematic diagram of another embodiment of the electrical discharge machining apparatus according to the invention, showing particularly its electrodes and the associated parts, that is, a multi-piece electrode consisting of a plurality of electrodes 12 arranged at predetermined intervals in the lengthwise direction of the axis of rotation of a roll 14 to face the central portion of the roll 14 between an insulator 52, on the one side, and exclusive end working heads 54 and 56 for working the ends of the roll 14 and exclusive end electrodes 62 and 64 respectively disposed on holders 58 and 60, on the other side. The electrical discharge machining process according to the second embodiment is performed by providing, for each of the exclusive end electrodes 62 and 64, the position detecting unit 40, the converter 42, the off time control unit 44 and the working pulse sourse unit 46 consisting of the pulse generator 48 and the switching device 50 shown in FIG. 2. Also in FIG. 3, a separate working pulse source unit 46 is provided for each of the electrodes 12.

It will thus be seen from the foregoing description that the present invention has a very great advantage that when working each end of a roll, the working current per unit working area is controlled constant by varying it in response to a decrease in the working area, thus giving a uniform satiny finish to the entire surface of the roll.

It is obvious that the embodiments of the present invention described hereinabove are merely illustrative and that other modifications and adaptations thereof may be made without departing from the scope of the appended claims.

What is claimed is:

1. In an electrical discharge machining apparatus comprising a pulse generator and a switching device for applying a pulse voltage across an electrode and a cylindrical work in response to output pulse signals from said pulse generator, wherein an electrical discharge machining is effected on the outer surface of said cylindrical work by means of a working current while rotating the cylindrical work and moving said electrode and said work relative to each other in the direction of the axis of rotation of said cylindrical work to define an electrode working area, the improvement wherein said apparatus comprises:

an electrode position detecting means for detecting a decrease in the electrode working area caused when the end portions of the cylindrical work are being machined and generating an output signal corresponding thereto;

converter means for generating a signal proportional to a deviation between the output signal of said electrode position detecting means and a preset value caused when the former exceeds the latter; and a control unit for controlling said pulse generator so as to change the output pulse signals thereof in accordance with the signal from said converter means;

said pulse generator, said switching device, said electrode position detecting means, said converter means and said control unit working together to decrease the working current in proportion to a decrease in the area where the cylindrical work is to be machined, caused when the end portions of the work are being machined, whereby to maintain the working rate per unit area of the cylindrical work constant to thereby satinize the end portions of the cylindrical work uniformly with the central portion thereof.

* * * * *